US 6,644,001 B2

(12) United States Patent
Krone et al.

(10) Patent No.: US 6,644,001 B2
(45) Date of Patent: Nov. 11, 2003

(54) IMPLEMENT COMBINATION

(75) Inventors: Bernard Krone, Spelle (DE); Martin Egbers, Recke (DE)

(73) Assignee: Maschinenfabrik Bernard Krone GmbH, Spelle (DE)

(*) Notice: Subject to any disclaimer, the term of this patent is extended or adjusted under 35 U.S.C. 154(b) by 0 days.

(21) Appl. No.: 10/150,717

(22) Filed: May 17, 2002

(65) Prior Publication Data
US 2002/0170723 A1 Nov. 21, 2002

(30) Foreign Application Priority Data
May 17, 2001 (DE) .................... 201 08 319 U

(51) Int. Cl.[7] .......................... A01B 59/048
(52) U.S. Cl. .................. 56/10.2 R; 172/311; 172/468; 701/50
(58) Field of Search ................ 172/452, 311, 172/310, 453–456, 458–460, 468–479; 56/7, 10.2 R, 83–92; 701/50

(56) References Cited

U.S. PATENT DOCUMENTS

| 3,722,193 A | 3/1973 | Strubbe | 56/208 |
| 4,211,057 A | 7/1980 | Dougherty et al. | 56/10.2 |
| 4,594,840 A | 6/1986 | D'Almeida et al. | 56/11.2 |
| 4,878,338 A | 11/1989 | Alred et al. | 56/7 |
| 5,713,190 A | 2/1998 | Vermeulen et al. | 56/10.2 E |

FOREIGN PATENT DOCUMENTS

| DE | 35 35 082 | 4/1987 |
| GB | 1 273 758 | 5/1972 |

Primary Examiner—Christopher J. Novosad
(74) Attorney, Agent, or Firm—Gudrun E. Huckett

(57) ABSTRACT

An implement combination has a self-propelled support vehicle moveable in a travel and working direction. At least one front-mounted implement is connected to a front end of the self-propelled support vehicle in the travel and working direction. At least one side-mounted implement is connected to a lateral side of the self-propelled support vehicle. A raising device transfers the front-mounted and side-mounted implements from a working and operating position near the ground into a partially raised head land position or into a completely raised transport position. The self-propelled support vehicle has a control and switching device. The front-mounted and side-mounted implements are coupled to the control and switching device such that a command for reverse travel of the control and switching device causes a mandatory raising of the front-mounted and side-mounted implements at least into the partially raised head land position.

6 Claims, 1 Drawing Sheet

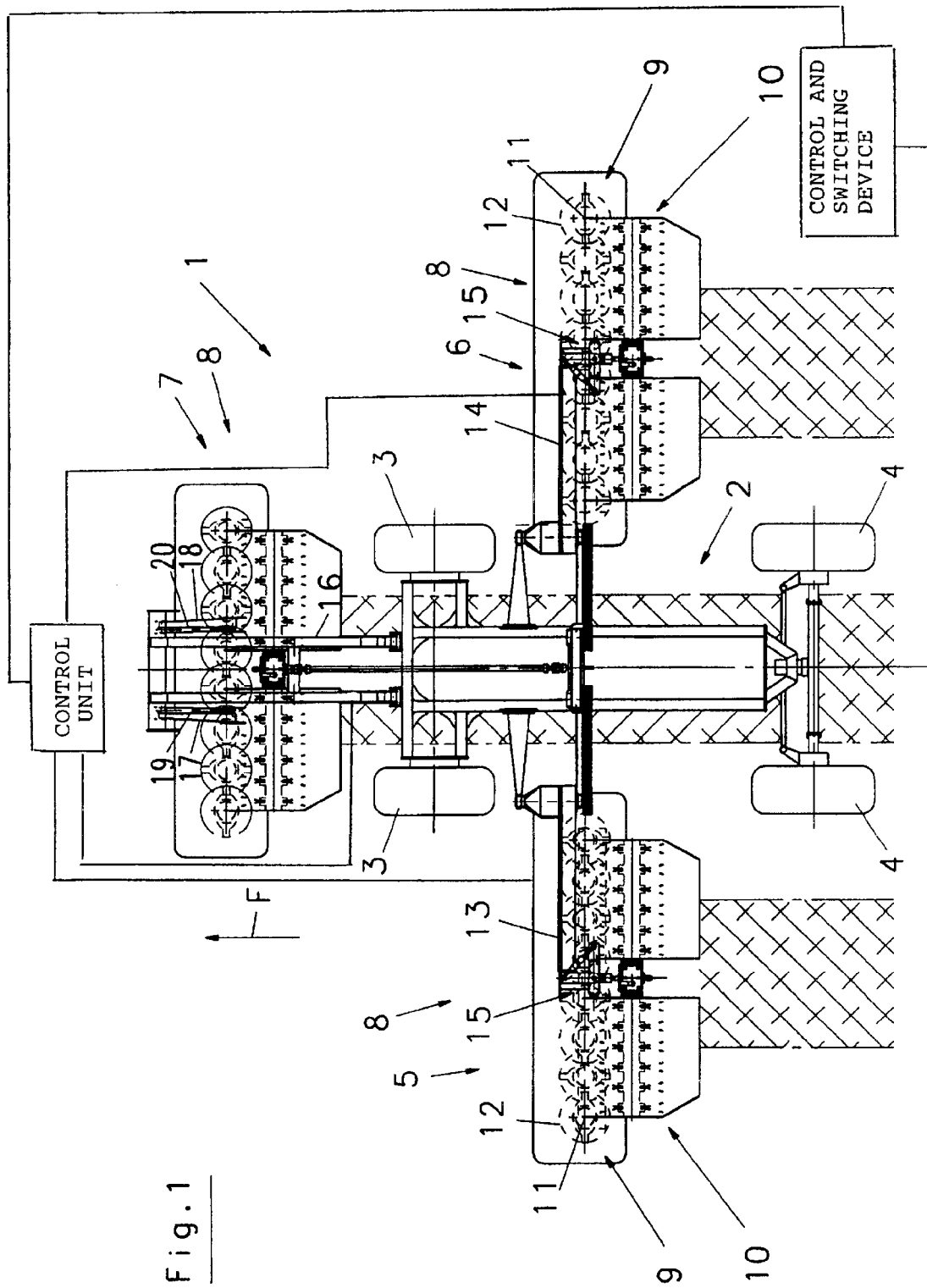

IMPLEMENT COMBINATION

BACKGROUND OF THE INVENTION

1. Field of the Invention

The invention relates to an implement combination including a self-propelled support vehicle and comprising implements preferably useable in the agricultural field such as, in particular, mowing units or mowing and processing units for harvesting agricultural crops. The support vehicle is provided accordingly with a front-mounted implement having correlated therewith at least one additional side-mounted implement. By means of a lifting device the implement or implements can be transferred from a working and operating position into a partially raised head land position or into a completely raised transport position. Such implement combinations are known in many different embodiments.

2. Description of the Related Art

In practice, it happens frequently that when mowing edge areas near fences, in particular, in the corner areas, the support vehicle must be driven in reverse with the mowing units being in the working and operating position. For this purpose, it is mandatory that before reverse travel all mowing units must be raised by the operator into a head land position. In practical use, however, it was found that this raising of the mowing units into the head land position is frequently overlooked by the operator; this results in damage to the mowing units because they are pushed into the already mowed crops or into the soil during reverse travel. The suspension of the mowing units is damaged in this way.

SUMMARY OF THE INVENTION

It is an object of the present invention to configure an implement combination vehicle of the aforementioned kind such that operating errors, in particular, during practical operation of the vehicle and during reverse travel, are prevented.

In accordance with the present invention, this is achieved in that the implement or implements on the support vehicle, in particular, the control unit of the raising device, is coupled such with the control and switching device of the traveling gear that, with the command for reverse travel of the support vehicle, the implement or implements are mandatorily raised at least into the partially raised head land position.

Preferably, the coupling between the raising device and the control and switching device of the traveling gear is realized by mechanical and/or electrical and/or hydraulic and/or pneumatic switching elements.

The coupling can be achieved by linking or chaining program flows of the traveling gear and of the raising device. Preferably, by means of linking or chaining the program flows of the traveling gear and of the raising device in connection with a command for reverse travel of the support vehicle, when using at least two implements, sequential switching for the program flow of the raising device is cancelled for the time of reverse travel.

The implement combination according to the invention provides that the raising movement of the implements in an embodiment, having an implement mounted at the front end or arranged at the front end and at least one implement side-mounted on the support vehicle relative to the travel and working direction, is controlled such that the command for reverse travel of the support vehicle results mandatorily in a raising of the implement or implements. According to the invention, a raising device of the support vehicle, which is provided for transferring the implement or implements from a working and operating position close to the ground into a partially raised head land position or into a completely raised transport position, is coupled with a control or switching device for the traveling gear of the support vehicle such that upon activation of the command for initiating reverse travel mandatorily a transfer of the implement or implements at least into the partially raised head land position is initiated. The partially raised head land position is defined such that the working implements are raised at least to such an extent that already deposited harvested crops swaths will not be contacted by the working tools of the implements and therefore will not be disturbed. The implement combinations for which the invention is suitable are, for example, self-propelled support vehicles or tractors which are furnished at least with one front-mounted implement in the form of a mowing and processing unit. This front-mounted implement can have correlated therewith side-mounted implements and embodied as mowing and processing units, wherein "side-mounted" in this context is meant to include attachment variations of an arrangement laterally adjacent to the front-mounted implement, an intermediate arrangement between the axles, and a rear-mounted arrangement. Moreover, the invention can also relate to an implement combination which is in the form of a self-propelled forage chopper with front-mounted, exchangeable harvesting attachment for harvesting corn plants or with a receiving drum for receiving swaths of grass or the like.

Advantageous embodiments of the invention can be based on the coupling between the raising device of the support vehicle and a control and shifting device of the traveling gear of the self-propelled support vehicle by means of mechanical, electric, hydraulic, or pneumatic switching elements. However, it is also conceivable that the selection of the switching elements includes combinations such as mechanical/electric or hydraulic/electric or pneumatic/electric embodiments. Moreover, in this connection the use of on-board computers is possible so that the coupling of the raising device with the control and switching device of the traveling gear can be achieved by linking or chaining program flows of the traveling gear and the raising device.

An advantageous further embodiment of the invention relates, for example, to an implement combination comprised of a front-mounted mowing and processing unit and two side-mounted mowing and processing units (front-mounted and side-mounted defined relative to the travel and working direction), wherein a sequence control (sequential switching) for raising the mowing and processing units is provided. This means that in the raising action of the mowing and processing units first the front-mounted mowing and processing unit is raised and, subsequently, after completion of a predetermined time interval correlated with the travel speed of the support vehicle, also the side-mounted mowing and processing units are raised. According to the invention, it is now provided that for the duration of reverse travel such a sequence control or sequential switching is cancelled because, before beginning the reverse travel, all mowing and processing units must be raised at the same time in order to prevent damage to the suspension of the mowing and processing units. Such a cancellation of the standard function is, for example, possible by an additional program command stored in the on-board computer.

BRIEF DESCRIPTION OF THE DRAWING

The only drawing FIG. 1 shows schematically a support vehicle with implements embodied as mowing and processing units in the working and operating position.

DESCRIPTION OF THE PREFERRED EMBODIMENTS

The implement combination 1 illustrated in FIG. 1 is comprised of a self-propelled support vehicle 2 having arranged thereat on opposed lateral sides between the front and rear wheels 3, 4 implements 5, 6 and an implement 7 arranged directly in front of the front wheels 3. The implements 5, 6, 7 of the implement combination 1 of the illustrated embodiment are mowing and processing units 8 for harvesting agricultural grain crops. Such a mowing and processing unit 8 is comprised of a mowing device 9 as well as a processing device 10 wherein the mowing device 9 has working tools which rotate about a vertical axis of rotation 11 and are in the form of cutting elements 12. The implements 5, 6, 7 can also be mulchers, sweepers, or similar working devices with completely different working tools. The support vehicle 2 is a self-propelled working and driving machine provided with rear wheel (4) steering. For reasons of simplifying the drawing, the support vehicle 2 is only schematically illustrated. The arrangement of the implements 5, 6, 7, in particular, of the mowing and processing units 8 on the support vehicle 2 is selected such that a continuous maximum total working width of the implement combination 1 results. The mowing and processing units 8 on either side of the support vehicle 2 are connected to the support vehicle 2 by means of boom and support arms 13, 14, connected in a pivotable and lockable way to the support vehicle 2, and an adjoining articulation 15, and, in this way, they can be moved back and forth between a horizontal working and operating position near the ground surface and a substantially vertical transport position as is generally known in the art. In the illustrated embodiment of FIG. 1, the mowing and processing unit 8 arranged at the front side of the support vehicle 2 is moveable by a support frame 16, vertically adjustably connected with the support vehicle 2, as well as additional pivotable connecting rods 17, 18 and hydraulic piston-cylinder arrangements 19, 20 from a working and operating position near the ground into a raised transport position parallel to the ground and back into the working and operating position. The partially raised head land position between the working and operating position and the transport position is reached when the mowing and processing unit 8 has been raised to such an extent that a contact of already deposited harvested crops swaths is no longer possible.

According to the invention the implement combination 1 is provided with a raising device which is comprised, inter alia, of the already mentioned mechanical components such as the boom and support arms 13, 14 with hydraulic piston/cylinder arrangements (not illustrated) and the support frame 16 in connection with the connecting rods 17, 18 and the hydraulic piston/cylinder arrangements 19, 20. Moreover, the raising device comprises additional hydraulic and/or electric components which serve for controlling the mechanical modular units 13, 14, 16, 17, 18, 19, 20 for transferring the implements 5, 6, 7 into the respective positions. For controlling its travel movements, the support vehicle 2 is provided with a control and switching device. Advantageously, the control and switching device of the traveling gear as well as control unit of the raising device are connected to or combined in an on-board computer with which all functions of the implement combination 1 can be controlled. According to the invention, the implement combination 1 and, in particular, the support vehicle 2, has mechanical and/or electric and/or hydraulic and/or pneumatic switching elements correlated therewith which enable such a coupling of the raising device with the control and switching device of the traveling gear that upon actuation of a command for initiating reverse travel in the practical operation mandatorily a raising of the mowing and processing units 8 out of the working and operating position near the ground into a partially raised head land position is realized. In an advantageous embodiment the support vehicle 2 is configured such that the switching elements are connected to the on-board computer for effecting coupling so that the coupling with the raising device is realized by chaining or linking program flows.

An advantageous further embodiment of the invention resides in that, for example, in the case of an implement combination 1 comprised of a front-mounted mowing and processing unit 8 and two side-mounted mowing and processing units 8 (front-mounted and side-mounted defined relative to the travel and working direction) a sequence control (sequential switching) for raising the mowing and processing units is provided. This means that in the raising action of the mowing and processing units 8, for example, during turning in with forward travel direction, first the front-mounted mowing and processing unit 8 is raised and, subsequently, after completion of a predetermined time interval correlated with the travel speed of the support vehicle 2, also the side-mounted mowing and processing units 8 are raised. According to the invention, it is now provided that for the duration of reverse travel such a sequence control or sequential switching is cancelled because, before beginning the reverse travel, all mowing and processing units 8 must of course be raised at the same time in order to prevent damage to the suspension of the mowing and processing units 8. Such a cancellation of a standard function is, for example, possible by an additional program command stored in the on-board computer.

While specific embodiments of the invention have been shown and described in detail to illustrate the inventive principles, it will be understood that the invention may be embodied otherwise without departing from such principles.

What is claimed is:

1. An implement combination comprising:
    a self-propelled support vehicle moveable in a travel and working direction;
    at least one front-mounted implement connected to a front end of the self-propelled support vehicle in the travel and working direction;
    at least one side-mounted implement connected to a lateral side of the self-propelled support vehicle in the travel and working direction;
    a raising device configured to transfer the at least one front-mounted and the at least one side-mounted implements from a working and operating position near a ground surface into a partially raised head land position or into a completely raised transport position;
    wherein the self-propelled support vehicle has a control and switching device and wherein the at least one front-mounted and the at least one side-mounted implements are coupled to the control and switching device such that initiation of a command by the control and switching device for reverse travel of the self-propelled support vehicle causes a mandatory raising of the at least one front-mounted and at least one side-mounted implements at least into the partially raised head land position;
    wherein the raising device and the control and switching device are coupled by linking a program flow of the raising device and a program flow of a traveling gear of the self-propelled support vehicle.

2. The implement combination according to claim 1, wherein the raising device has a control unit and wherein the control unit is coupled to the control and switching device and the command for reverse travel of the control and switching device acts on the control unit.

3. The implement combination according to claim 1, further comprising switching elements selected from the group consisting of mechanical switching elements, electric switching elements, hydraulic switching elements, pneumatic switching elements, mechanical/electric switching elements, hydraulic/electric switching elements, and pneumatic/electric switching elements, wherein the raising device and the control and switching device are coupled by the switching elements.

4. The implement combination according to claim 1, wherein the least one front-mounted and the at least one side-mounted implements are agricultural implements.

5. An implement combination comprising:

a self-propelled support vehicle moveable in a travel and working direction;

at least one front-mounted implement connected to a front end of the self-propelled support vehicle in the travel and working direction;

at least one side-mounted implement connected to a lateral side of the self-propelled support vehicle in the travel and working direction;

a raising device configured to transfer the at least one front-mounted and the at least one side-mounted implements from a working and operating position near a ground surface into a partially raised head land position or into a completely raised transport position;

wherein the self-propelled support vehicle has a control and switching device and wherein the at least one front-mounted and the at least one side-mounted implements are coupled to the control and switching device such that initiation of a command by the control and switching device for reverse travel of the self-propelled support vehicle causes a mandatory raising of the at least one front-mounted and at least one side-mounted implements at least into the partially raised head land position;

wherein the raisins device and the control and switching device are coupled by linking a program flow of the raising device and a program flow of a traveling gear of the self-propelled support vehicle;

further comprising a sequence control for sequentially raising the at least one front-mounted and the at least one side-mounted implements, wherein linking of the program flow of the raising device and the program flow of the traveling gear in combination with the command for reverse travel cancels the sequence control for the duration of reverse travel.

6. The implement combination according to claim 5, wherein the agricultural implements are mowing units or mowing and processing units for harvesting agricultural crops.

\* \* \* \* \*